G. H. MAGRATH

SPINDLE CLUTCH

Feb. 10, 1931. Re. 17,964

Original Filed Oct. 7, 1927

Inventor
George H. Magrath
By Attorneys
Southgate Fay & Hawley

Reissued Feb. 10, 1931 Re. 17,964

UNITED STATES PATENT OFFICE

GEORGE H. MAGRATH, OF WHITINSVILLE, MASSACHUSETTS

SPINDLE CLUTCH

Original No. 1,741,197, dated December 31, 1929, Serial No. 224,725, filed October 7, 1927. Application for reissue filed September 16, 1930. Serial No. 482,347.

This invention relates to means for detachably connecting a bobbin to a spinning or twisting spindle, so that the bobbin may be centered and rotated therewith. More specifically, the invention relates to a type of spindle clutch in which a yielding friction drive is provided between the bobbin and the spindle, my present invention being in the nature of an improvement over the construction shown in my prior Patent No. 1,457,226.

It is the object of my invention to provide an improved type of spindle clutch, so designed that it will be effective in operation, economical to manufacture, and of such construction that ends of yarn wound thereon may be easily and quickly removed therefrom.

My invention further relates to arrangements and combinations of parts which will be hereinafter described and more particularly pointed out in the appended claims.

A preferred form of the invention is shown in the drawings in which.

Figure 1:
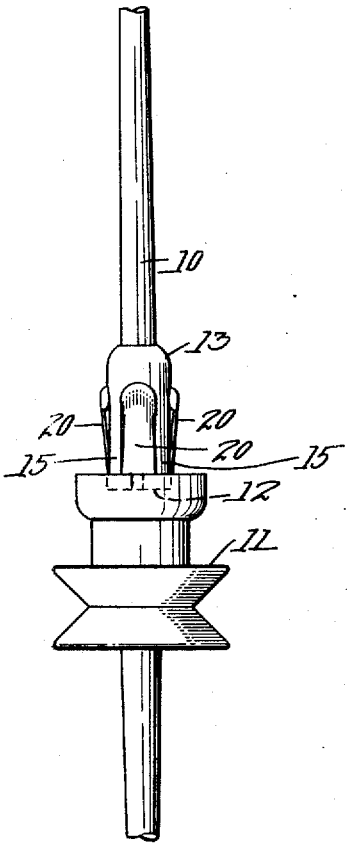
Fig. 1 is a partial side elevation of a spindle embodying my improvements.

Referring to the drawings, we have shown a portion of a spindle 10 having a driving member or whorl 11 fixed thereon, and provided with a recess 12 in its upper face portion. A casing 13 is mounted on the spindle 10, preferably with a tight force fit, and is provided with a recess 14 in its inner or lower face.

Wall portions 15 extend downward from the casing 13 into the recess 12 of the driving member 11. These wall portions are spaced apart to provide slots or openings 16 and are preferably reduced in thickness at their lower ends as indicated at 17. The portions 17 may be bent outward at a slight angle to more firmly engage the surrounding structure if so desired.

Figure 5:
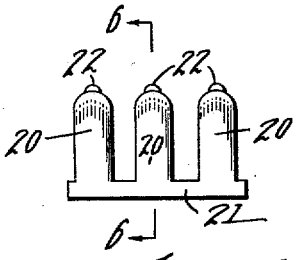
Fig. 5 is a side elevation of the spring clutch fingers in extended form.
Figure 6:
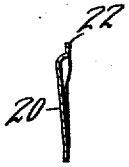
Fig. 6 is a sectional elevation, taken along the line 6—6 in Fig. 5.
Figure 7:
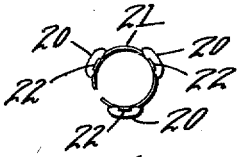
Fig. 7 is a plan view of the clutch fingers, positioned in their final or operative relation.
Figure 3:
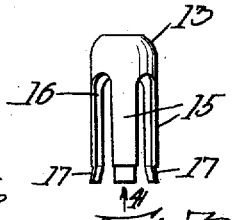
Fig. 3 is a side elevation of the clutch casing member.
Figure 4:
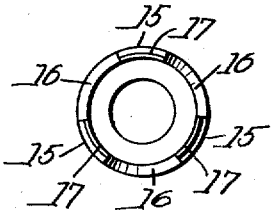
Fig. 4 is a bottom view thereof, looking in the direction of the arrow 4 in Fig. 3.

Spring clutch fingers 20 are mounted within the slots or recesses 16, said fingers being preferably formed on a connecting portion or member 21. They may be conveniently blanked out in extended form as shown in Fig. 5, to be thereafter bent to the circular relation indicated in Fig. 7 in which the connecting portion or member 21 forms a wall or ring adapted to extend circumferentially of the spindle. Each clutch finger 20 has a lug or projection 22 extending upwardly therefrom for a purpose to be described.

Figure 2:
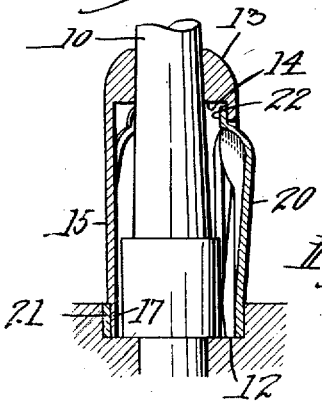
Fig. 2 is a partial sectional elevation thereof.

In assembling the parts, the annular connecting member 21 surrounds the lower end portions 17 of the wall sections 15, and said annular member is seated snugly in the recess 12, all as clearly indicated in Fig. 2. It will also be apparent from this view that the lower end portions 17 of the casing member 13 are substantially rigid with the spindle and constitute abutment means which engage the integral connecting portion 21 for retaining the latter in the recess 12 of the driving member. The lugs 22 extend upward into the recess 14 of the casing and the clutch fingers are thus limited in their outward movement.

When a bobbin is forced downward on the spindle, the clutch fingers 20 are yieldingly engaged and forced inward, thus centering the bobbin and providing a friction drive therefor. The substantially straight fingers 20 provide smooth and continuous outer surfaces over which coils of yarn, accidentally wound about the spindle, may be readily removed.

The present construction is extremely simple to manufacture and is readily assembled, the several parts cooperating to thereafter retain all parts of the device in operative relation.

Having thus described my invention and the advantages thereof, I do not wish to be limited to the details herein disclosed otherwise than as set forth in the claims.

I claim:

1. The combination of a spindle, a driving member fixed and centered thereon, a spindle clutch comprising a recessed cylindrical casing fixed and centered on said spindle, and having a plurality of spaced vertical slots in the cylindrical side wall thereof, said slots being closed at their upper ends and open at their lower ends, a plurality of spring clutch fingers, means for retaining the lower ends of said fingers on said driving member and for maintaining said fingers at substantially equal radii from the axis of said spindle, so as properly to center a bobbin thereon, said fingers extending upwardly in and outwardly from said slots directly to engage a bobbin on said spindle, said fingers having their upper end portions engaging said casing within said casing recess to limit outward yielding movement of said fingers.

2. The combination of a spindle, a driving member fixed and centered thereon, a spindle clutch comprising a recessed cylindrical casing fixed and centered on said spindle, and having a plurality of spaced vertical slots in the cylindrical side wall thereof, said slots being closed at their upper ends and open at their lower ends, a substantially annular member mounted on said driving member and axially centered thereby, and a plurality of spring clutch fingers on the annular member and extending upwardly in said slots, and directly engaging the casing within said casing recess to limit outward yielding movement of said fingers.

3. A spindle having a driving member with a recessed upper face, a recessed casing fixed on said spindle and having spaced wall portions extending downward into the recess of said driving member, a plurality of spring clutch fingers, and a substantially annular member supporting said fingers and firmly seated and centered in the recess of said driving member and closely surrounding and centering said wall portion ends, said clutch fingers presenting substantially unbroken and continuous outer surfaces directly engaging the bobbin on said spindle and having lugs projecting upward into the recess of said casing to limit outward yielding movement of said clutch fingers.

4. The combination of a spindle, axially spaced driving and casing members affixed thereto, these members having opposed recessed portions extending about the spindle, bobbin clutching means comprising a circumferentially extending wall spaced from the spindle and fitting within and against the recessed portion of one of said members, and a plurality of longitudinally extending fingers disposed about the spindle, each finger having one end rigid with the circumferential wall and its free end disposed within the recessed portion of the other of said members, the intermediate portion of each finger being yieldable radially of the spindle for engagement with a bobbin.

5. The combination of a spindle, axially spaced driving and casing members affixed thereto, these members having opposed substantially cylindrical recessed portions coaxial with the spindle, bobbin clutching means comprising a substantially cylindrical wall spaced from the spindle at approximately the radius of the bobbin chamber to be engaged, this wall having its outer surface complementary to and fitting against the substantially cylindrical recessed portion of one of said members, a plurality of resilient fingers disposed longitudinally about the spindle, each finger having one end rigid with the cylindrical wall and a free end disposed within the recessed portion of the other of said members, and means providing a relatively rigid surface engageable with the free end of each finger for limiting radial movement of said finger and for tending to maintain the intermediate portion of said finger in position for engagement with a bobbin.

6. The combination of a spindle, axially spaced driving and casing members affixed thereto, these members having opposed recessed portions providing interior surfaces substantially concentric with the spindle, and bobbin clutching means comprising a circumferentially extending wall having its outer surface spaced from the spindle at approximately the radius of the bobbin chamber to be engaged, this wall having its outer surface complementary to and fitting within and against the recessed portion of one of said members, and a plurality of outwardly bowed fingers disposed longitudinally about the spindle, each finger having one end rigid with the circumferential wall and a free end disposed within the recessed portion of the other of said members, the latter end having its outer surface normally bearing against an inner surface of this member to be retained thereby.

7. The combination of a spindle, axially spaced driving and casing members affixed thereto, these members having opposed recessed portions extending about the spindle, bobbin clutching means comprising a circumferentially extending wall spaced from the spindle and fitting within and against the recessed portion of one of said members, abutment means rigid with the spindle and engaging this wall for retaining the latter in this recessed portion, and a plurality of resilient fingers disposed longitudinally about the spindle, each finger having one end rigid with the circumferential wall and its free end disposed within the recessed portion of the other of said members, this free end having its outer surface normally bearing against an inner surface of this member to be retained thereby.

8. The combination of a spindle, axially spaced driving and casing members affixed thereto, a plurality of resilient fingers disposed longitudinally between the driving and casing members, each finger being disposed at substantially the same radius from the spindle, the casing member being recessed to receive the end portions of the fingers, one end of each finger being free and disposed within the recessed portions of the casing member for movement radially of the spindle, an integral connection between the other ends of the fingers, the driving member having a recess complementary to said integral connection and receiving the latter, said integral connection also being spaced from the spindle, and means carried by the casing member for retaining said integral connection in the recess of the driving member.

Signed by me at Boston, Massachusetts, this 13th day of September, 1930.

GEORGE H. MAGRATH.